United States Patent [19]

Hertzenberg et al.

[11] 4,138,363

[45] Feb. 6, 1979

[54] SILANE-ZEOLITE COMPOSITIONS

[75] Inventors: Elliot P. Hertzenberg, Wilmington, Del.; Howard S. Sherry, Cherry Hill, N.J.

[73] Assignee: PQ Corporation, Valley Forge, Pa.

[21] Appl. No.: 833,122

[22] Filed: Sep. 14, 1977

[51] Int. Cl.$^2$ .......................... B01J 29/06; B01J 31/02
[52] U.S. Cl. ................................. 252/430; 252/455 Z; 252/89 R; 252/81
[58] Field of Search ................. 252/455 Z, 430, 89 R, 252/91; 423/328; 55/75

[56] References Cited

U.S. PATENT DOCUMENTS

| | | | |
|---|---|---|---|
| 3,725,302 | 4/1973 | Shively et al. | 252/455 Z |
| 4,066,394 | 1/1978 | Leonard | 423/328 X |

*Primary Examiner*—Carl Dees
*Attorney, Agent, or Firm*—Ernest G. Posner; Fred C. Philpitt; J. S. Stephen Bobb

[57] ABSTRACT

Hydrophilic, silane-zeolite compositions, their preparation, properties and applications are disclosed. These unique composites are formed by condensing a hydrophilic silane onto the surface of a hydrated zeolite. The properties of the silane-zeolite composite are surprisingly similar to those of the zeolite without the surface modification of the silane. These composites are useful in numerous applications of zeolite, particularly in aqueous environments. The composites are particularly suited to be included in detergent compounds as the builder since they do not agglomerate with other detergent ingredients as do zeolites.

15 Claims, No Drawings

SILANE-ZEOLITE COMPOSITIONS

BACKGROUND OF THE INVENTION

This invention relates the field of zeolites. In particular, it relates to a new composite of silane and zeolite which exhibits properties making it a valuable detergent component. The reactions of anhydrous zeolites with silanes have been studied by McAteer and Rooney, "Proceedings of the Third International Conference on Molecular Sieves", J. B. Unterhoeven, Editor, Zurich, Sept. 3 -7, 1973, pages 258-265, and Barrer, Jenkens and Peeters; "Molecular Sieves II", J. R. Katzer, Editor; "ACS Symposium Series", pages 258-270. These studies were carried out on molecular sieves activated by fully dehydrating the materials at highly elevated temperatures. It was found that the sodium form of the molecular sieve did not react strongly with silanes to produce composite products. A number of the properties of zeolite in the hydrogen form which did form some bonds with silanes were drastically altered.

German Patent Application, DT No. 2,510,741 and DT No. 2,510,742, teach that zeolites can be modified by mixing them with solutions of phosphate and tartrate, drying and grinding. Such treatment is required by some zeolites to enhance performance in detergent formulations. It is not surprising that the zeolites capacity to inactivate hard water ions should be improved since the materials employed to coat them are essentially sequestering agents.

It is an object of this invention to provide hydrophilic, silane-zeolite composites and a process for preparing them. It is a further object of this invention that the zeolite be in the sodium form and that the composite product be suitable for inclusion in detergent formulations.

SUMMARY OF THE INVENTION

Silane-zeolite composite products can be prepared by silanation of hydrated zeolites in the sodium form at relatively low temperatures. The composite product is hydrophilic since the silane has hydrophilic functionality. The properties of the product are changed only slightly from those of the starting zeolite, and the product is readily used in various applications including detergent formulations.

THE INVENTION

The silane-zeolite composition of our invention can be formed with either synthetic or natural zeolites which are hydrated and in the sodium form. Synthetic zeolites are usually used since they can be specially manufactured to provide the desired properties. Synthetic crystalline sodium alumino silicates such as those described in U.S. Pat. Nos. 2,882,243-4; 3,012,853; 3,130,007; and 3,329,628, among others, are suitable to prepare the product of our invention. While any hydrated zeolite can be treated by our process to provide the silane-zeolite composite, we usually use zeolites conforming to the following formula:

$$Na_x [(AlO_2)_x (SiO_2)_y] Z\ H_2O$$

In this formula, x and y are integers of at least 6; the molar ratio of x to y is in the range of 0.1 to 1.1 and Z is an integer from about 8 to 250. In general, the water content should be 15 to 35% by weight of the zeolites. We also commonly use a zeolite of the formula:

$$Na_{12}[(AlO_2)_{12}(SiO_2)_{12}]Z\ H_2O$$

wherein Z is about 20 and within the range of 15 to 35% water. Another useful zeolite has the formula:

$$Na_x[(AlO_2)_x(SiO_2)_y]Z\ H_2O$$

wherein x is an integer between 80 and 96 and y is an integer between 112 and 96 and Z is between 220 and 270. Again, the water content is between 15 and 35% of the zeolite.

Such synthetic zeolites are most conveniently prepared by the hydrothermal treatment of an alumino-silicate gel which is prepared by the mixing of aqueous sources of alumina and silica. The hydrothermal treatment of the amorphous gel causes the crystallization of the zeolite species desired. Conventional filtering, drying and grinding steps complete the preparation. Of course, as hereinbefore indicated, synthetic and natural zeolites, no matter how prepared, can be used to prepare the product of our invention.

The silanes used in preparing the composition of our invention are organosilicon compounds which usually contain chemical groups of at least 2 different degrees of reactivity attached to the silicon atoms. One group is attached to the silicon in a stable manner. Other groups hydrolyze providing active silanol sites which condense with the hydroxyl groups on the zeolite surface, thereby attaching the silane to the surface of the zeolite. The modified zeolite of our invention must be hydrophilic to function effectively in an aqeuous environment, therefore, the stable group of the silane is of hydrophilic functionality. Examples of such hydrophilic groups that are useful in the composition of our invention include among others, acrylates, epoxies, amines and carboxylates. In addition, silanes with non-hydrophilic functionalities can also be attached to the surface of the zeolite if the hydrophobic group can than be converted to a hydrophilic group by further chemical treatment.

The preparation of the desired non-agglomerating silane treated zeolite of our invention requires consideration of several variables which influence product quality and whether it is suitable for the appropriate purpose. The zeolite should be in the sodium form. An apparently important consideration is the moisture content of the starting zeolite. If the moisture content is too low, the silane does not properly attach to the zeolite surface. We have found that zeolites with water contents of 15 to 35% as indicated by the loss on ignition (LOI), can be reacted successfully with silanes to form the desired product. While the amount of silane required to cover the surface of the zeolite will vary, we have found that about 0.1 to 3.5% is effective. We prefer to use 0.2 to 2.8%.

The silane-zeolite composition of our invention can be prepared in the following manner. The zeolite containing a significant moisture level and the silane are placed in a closed container. The silane may be dropped or sprayed onto the agitating zeolite. The container is then rolled or manipulated so that the contents remain in motion. Another method is to apply the silane using a solvent. The zeolite is added to water or water miscible organic solvent which contains 0.1 to 0.9% water. This slurry is agitated while the silane which is dissolved in an organic solvent is added. The solvent is removed by evaporation or filtering and drying to recover the product. Temperatures of less than 100° C. are required for these treatments and to cure the silane zeolite bonds. If temperatures in excess of 100° C. are used, there is sufficient disruption of the water structure of the zeolite that silanation of the surface is significantly impaired. We prefer 22 to 95° C. as treatment temperatures and curing temperatures for our system. If the zeolite does lose water of hydration during treatment, it can be replaced by placing the silane-zeolite composite in a moist atmosphere.

We find it surprising that we obtain stable silane-zeolite composites at such low curing temperatures. The prior art references require curing temperatures of more than 200° C. to obtain some bonding of the silane to the zeolite. We also find it surprising that zeolites in the sodium form can be silanated by our method since the prior art indicated considerable difficulty in providing silane zeolite bonding.

The product we have found is a silane-zeolite composite which contains 0.05 to 3.35% hydrophilic silane, attached to the zeolite surface, 15 to 35% water and the remainder crystalline sodium alumino silicate. The properties of the zeolite are not changed significantly by forming the silane-zeolite composite.

EXAMPLES

The following Examples illustrate certain embodiments of the invention and are not considered as limiting to the scope of the scope of the invention. The limits of the invention are fully set forth in the specification and the claims. The proportions are in parts by weight (pbw) and percent by weight (%), unless otherwise stated. The zeolite used in the Examples was Zeolite A in the sodium form with a LOI of 20.24%, a calcium exchange rate (CER) of 190Mg. of $CaCO_3/2$ min., a calcium exchange capacity (CEC) of 268Mg. $CaCO_3/g$, an average agglomerate size of 7.5 microns and an average ultimate particle size of 2 to 4 microns.

EXAMPLE 1

Zeolite A (100 pbw) was slurried with a solution of 158 pbw of methanol and 1 pbw of water. This slurry was agitated at 25° C. and a solution of 0.2 pbw of beta-3, 4 epoxy cyclohexylethyl trimethoxy silane in 7.9 pbw of methanol was added to the slurry. Agitation was continued for 2 hours. The methanol was evaporated at 25° C. for 36 hours at which time the product was recovered.

A second 100 pbw portion of Zeolite A was reacted with 0.5 pbw of the silane in the same manner.

Both products were fine white powders with the silane attached to the surface. The properties were:

| Silane Level (%) | CER ($MgCaCO_3/g/$ 2 min.) | CEC ($MgCaCO_3/g.$) | Ave. Agglomerate Size (Microns) |
|---|---|---|---|
| 0.2 | 173 | 276 | 7.3 |
| 0.5 | 184 | 276 | 6.6 |

The silane modified zeolite was completely hydrophilic and non-agglomerating in detergents.

EXAMPLE 2

The preparations of Example 1 were repeated, except that the methanol was evaporated off at 75° C. in 90 minutes. Heat treatment was continued for 30 minutes to cure the silane-zeolite bonds. The properties of the product were similar to the properties of the products prepared according to Example 1.

EXAMPLE 3

The preparations of Example 1 were repeated, except that gama-glycidoxypropyltrisilane was used to treat the zeolite. The properties of the products were:

| Silane Level (%) | CER ($MgCaCO_3/g/$ 2 min.) | CEC ($MgCaCO_3/g$) | Ave. Particle Size (Microns) |
|---|---|---|---|
| 0.2 | 170 | 272 | 6.7 |
| 0.5 | 174 | 279 | 6.6 |

These products were also hydrophilic and non-agglomerating in detergents.

EXAMPLE 4

The preparations of Example 1 were repeated, except that gamma-aminopropyltrimethoxysilane was used to treat the zeolite. The properties were:

| Silane Level (%) | CER ($MgCaCO_3/g/$ 2 min.) | CEC ($MgCaCO_3/g.$) | Ave. Particle Size (Microns) |
|---|---|---|---|
| 0.2 | 181 | 272 | 6.2 |
| 0.5 | 175 | 273 | 8.9 |

These products were also hydrophilic and could be used without agglomeration in detergents.

EXAMPLE 5

Zeolite A (100 pbw) was placed in a closed container with 0.1 pbw of methyltrichlorosilane. The mixture was tumbled for several hours at 25° C. to assure complete mixing. The product was completely hydrophobic; it could not be mixed or slurried with water. Further chemical treatment rendered the material hydrophilic.

EXAMPLE 6

The preparation of Example 5 was repeated, except that the the mixture was heated to 50° C. while tumbling. The reaction was completed in 30 minutes. The product floated on water and would not mix with it.

We claim:
1. A composition of matter consisting essentially of:
(a) 96.65 to 99.95% by weight of zeolite in the sodium form, containing 15 to 35% water, and
(b) 0.05 to 3.35% by weight of silane having a hydrophilic functionality.
2. The composition of claim 1 wherein the zeolite has the following formula:

$$Na_x[(AlO_2)_x(SiO_2)_y]Z\ H_2O$$

wherein x and y are integers of at least 6; the molar ratio of x to y is in the range of 0.1 to 1.1 and Z is an integer such that the water content is between 15 and 35%.
3. The composition of claim 2 wherein x and y are 12.
4. The composition of claim 1 wherein x various between 80 and 96, y varies between 112 and 96 and Z is an integer such that the water content is between 15 and 35%.
5. The composition of claim 1 wherein the hydrophilic functionality of the silane is selected from the group consisting of acrylates, epoxies, amines and carboxylates.

6. A process for preparing hydrophilic silane-zeolite compositions, comprising the steps of:
(a) preparing a solution of an organic solvent and 0.1 to 0.9% by weight of water;
(b) adding zeolite to said solution thereby forming a slurry, said zeolite being in the sodium form and containing 15 to 35% by weight of water;
(c) maintaining the temperature of said slurry between 22 and 95° C.;
(d) agitating said slurry and adding a solution of a silane in an organic solvent, said silane of hydrophilic functionality and present in an amount to provide 0.05 to 3.35% of the final composition by weight;
(e) agitating said slurry for a sufficient period of time to assure reaction of the silane with the zeolite surface, and
(f) removing said organic solvent and drying to recover the composition.

7. The process of claim 6 wherein the zeolite has the composition:

$$Na_x[(AlO_2)_x(SiO_2)_y]Z\ H_2O$$

wherein x and y are integers of at least 6 and the molar ratio of x to y is 0.1 to 1.1 and Z is an integer such that the water content of said zeolite is 15 to 35% by weight.

8. The process of claim 7 wherein x and y are 12.

9. The process of claim 7 wherein x is 80 to 96, y is 112 to 96 and Z is an integer such that the water content is between 15 and 35%.

10. The process of claim 5 wherein the functional group on the silane is selected from the group consisting of acrylates, epoxies, amines and carboxylates.

11. A process for preparing a hydrophilic silane-zeolite compositions, comprising the steps of:
(a) placing 96.5 to 99.95% by weight of zeolite and 0.05 to 3.5% of a hydrophilic silane in a closed container, said zeolite being in the sodium form and containing 15 to 35% water by weight;
(b) agitating said zeolite and silane mixture for a time sufficient to ensure complete mixing;
(c) maintaining the temperature of the zeolite-silane mixture at 22 to 95° C. while agitating, and
(d) recovering the product.

12. The process of claim 11 wherein the zeolite has the formula:

$$Na_x[(AlO_2)_x(SiO_2)_y]Z\ H_2O$$

wherein x and y are integers of at least 6 and the molar ratio of x to y is 0.1 to 1.1 and Z is an integer such that the water content is 15 to 35%.

13. The process of claim 12 wherein x and y are 12.

14. The process of claim 11 wherein the functional groups on the silane is selected from the group consisting of acrylates, epoxies, amines and carboxylates.

15. The process of claim 12 wherein x is 80 to 90, y is 112 to 96 and Z is an integer such that the water content is between 15 and 35%.